United States Patent Office 3,179,636
Patented Apr. 20, 1965

3,179,636
POLYESTERS AND METHOD OF PREPARATION
Robert J. Convery, Wilmington, Del., assignor to Sun Oil Company, Philadelphia, Pa., a corporation of New Jersey
No Drawing. Filed Jan. 13, 1961, Ser. No. 82,379
16 Claims. (Cl. 260—78.3)

This invention relates to novel polyesters prepared by homocondensation of 1-hydroxyalicyclic carboxylic acids, e.g., 1-hydroxycyclohexane carboxylic acid.

Polyester resins usually have been prepared heretofore by the intercondensation of a dibasic acid with a glycol. The present invention provides a novel type of polyester which is prepared from a single reactant which is a hydroxycycloaliphatic acid in which the hydroxyl and carboxyl groups each are attached to the same carbon atom in the cycloaliphatic ring. It has now been found that the homocondensation of this type of compound can be effected under certain special conditions to produce polyesters which are either viscous oils or solid amorphous polymers depending upon the degree of condensation effected, i.e., the size of the molecules produced.

According to the invention, novel polyesters are produced which have the generic formula:

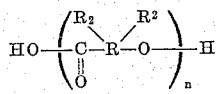

from a 1-hydroxyalicyclic carboxylic acid having the generic formula:

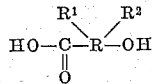

wherein R is an alicyclic group having 5–6 carbon atoms and $R^1$ and $R^2$ each are selected from the group consisting of hydrogen and alkyl groups having 1–10 carbons. Formation of the polyester is effected by heating the 1-hydroxyalicyclic carboxylic acid together with a carboxylic acid anhydride at a temperature in the range of 100–250° C. Under these conditions it has been found that the hydroxyalicyclic carboxylic acid undergoes homocondensation, whereby a carboxyl group of one molecule reacts with a hydroxyl group of another molecule thus splitting out water. The water reacts with the anhydride which is thereby converted to the corresponding carboxylic acid. The reaction mixture is maintained at the reaction temperature for a time sufficient to cause the polyester product to contain at least three monomeric units derived from the hydroxycarboxylic acid. Conditions can be varied to form products ranging from viscous liquids to solid amorphous polymers of high molecular weight.

In carrying out the reaction the anhydride generally should be employed in a molar ratio to the hydroxy acid of 1:1 to 10:1 and more preferably 1:1 to 2:1, and it is preferred to include in the reaction mixture an inert solvent capable of dissolving the anhydride and the hydroxy acid. Suitable solvents are aromatic hydrocarbons, such as toulene, xylenes, trimethyl benzenes and the like, and ethers such as diglyme, triglyme, dibutyl ether, diamyl ether, dihexyl ether, di-(chloroethyl) ethers, dioxane, anisole and the like. It is also generally preferred to utilize a reaction temperature in the range of 130–180° C. The time of reaction can vary considerably, e.g., from 0.5 to 100 hours, depending upon the molecular weight of the product desired and the other reaction conditions employed. The polymer product is recovered from the reaction mixture by distilling off the solvent and organic acid formed during the reaction or, if the molecular weight of the polymer is sufficiently high, by precipitation by means of an anti-solvent such as methanol.

The preferred reactants are 1-hydroxycyclohexane carboxylic acid and acetic anhydride. However, any other hydroxy acid as specified above can be substituted for 1-hydroxycyclohexane carboxylic acid and the same type of reaction will result to produce polyesters composed of monomeric units each containing an alicyclic ring. The alicyclic rings correspond to either cyclohexane or cyclopentane. The ring can contain either no alkyl group substituent or else up to two such substituents each of which can have from 1–10 carbon atoms, thus varying from methyl to decyl. The important feature of the hydroxy acid is that it have either a five or six carbon atom ring with both a hydroxyl group and a carboxyl group attached to the same carbon atom.

The anhydride used in the reaction can be an anhydride of any aliphatic, alicyclic or aromatic acid having 2–8 carbon atoms. Besides the preferred acetic anhydride, the following are examples of suitable aliphatic acid anhydrides: propanoic, butanoic, hexanoic, octanoic, 2-methylpropanoic, 2,2-dimethylpropanoic and 3-methylbutanoic. Examples of alicyclic anhydrides are those of cyclopropane, cyclobutane, cyclopentane and cyclohexane carboxylic acids. Examples of aromatic anhydrides are those of benzoic and toluic acids, and phenyl acetic acid anhydride. Mixed anhydrides, such as ethanoic propanoic acid anhydride, can also be used.

As previously stated the reaction can be carried out to prepare polyesters ranging from viscous oils to high molecular weight amorphous solids depending upon the number of monomer units in the polymer molecules. The minimum number of units contemplated within the scope of the invention is three, which for the preferred reactants (1-hydroxycyclohexane carboxylic acid and acetic anhydride) corresponds to a minimum molecular weight of 396. Such polyester is a material of lubricating oil consistency. The formation of the higher molecular weight materials is favored by increase in reaction temperature, by increase in time and by removal during the course of the reaction of the aliphatic acid to which the anhydride is converted. Continuous removal of such acid by-product during the reaction is particularly desirable when especially high molecular weight products are desired. For example, in preparing high molecular weight solid polyesters from 1-hydroxycyclohexane carboxylic acid utilizing acetic anhydride as the other reactant, the acetic acid formed can be continuously distilled from the reaction mixture to help promote the homocondensation reaction and increase the length of the polymer chains.

The products prepared by the present reaction are useful in various applications. They can, for example, be reacted with diisocyanates to form special types of polyurethanes. The viscous liquid products can be utilized as lubricating oil additives or as lubricating oils per se. The presence of the polar groups in the products renders them particularly useful as plasticizers for other resins such as polyvinyl chloride. The high molecular weight solid polymers can be formed into fibers or used in molded articles.

It should be noted that the present reaction of a hydroxyacid and an anhydride does not proceed in the manner that might have been expected. For example, in reacting 1-hydroxycyclohexane carboxylic acid and acetic anhydride, one might have expected the following reaction to take place:

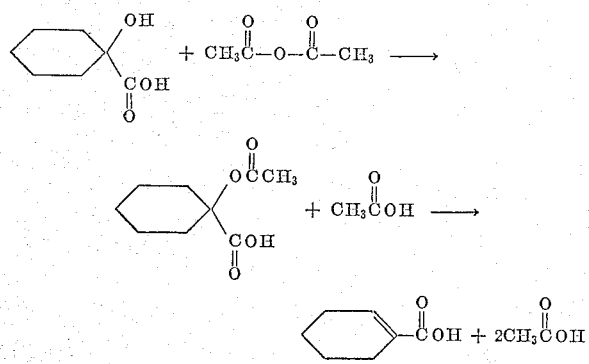

No evidence of such reaction has been found, but instead the above-discussed homocondensation reaction occurs. It should also be noted that when other dehydrating agents are used in place of acetic anhydride, the reaction does not proceed in the same manner as herein described. For example, when either sulfuric acid or toluene sulfonic acid is substituted for acetic anhydride, some benzoic acid is produced but no polyester is formed. These facts illustrate the unpredictability of the present reaction.

The following examples are specific illustrations of the present invention:

Example I

This example illustrates the production of solid polyester which does not have a particularly high molecular weight. A mixture of 28.8 g. (0.2 mole) of 1-hydroxycyclohexane carboxylic acid, 30.0 g. (0.29 mole) of acetic anhydride and 300 ml. of p-xylene was heated under refluxing conditions (circa 140° C.) for 20 hours. The lower boiling materials were then distilled off over a time of 12 hours, first at atmospheric pressure and subsequently under vacuum, leaving a residue which was a yellow viscous liquid at the pot temperature. Upon cooling this material solidified to a glass-like solid. The amount obtained was 20 g., corresponding to a yield based on the theoretical of about 80%. The product had a molecular weight, as calculated from the neutralization equivalent, of 1347 and a softening point in the range of 85–95° C., and it could be drawn into threads. The infra red spectrum showed that the polymer was a polyester and showed it to be amorphous. The elemental analysis, as compared to the theoretical for the polyester, was as follows:

|          | Found, percent | Theory, percent |
|----------|----------------|-----------------|
| Carbon   | 66.2           | 67.2            |
| Hydrogen | 7.7            | 7.2             |
| Oxygen   | 26.3           | 25.6            |

Example II 7.2 g. (0.05 mole) of 1-hydroxycyclohexane carboxylic acid and 15.0 g. (0.15 mole) of acetic anhydride without any solvent were heated under refluxing conditions for about 5½ hrs. The acetic acid by-product and unreacted acetic anhydride were then removed by distillation first at atmospheric pressure and then under vacuum. The polyester product was a brittle solid. This example shows that the use of an inert solvent in the reaction is not essential.

Example III 7.2 g. (0.05 mole) of 1-hydroxycyclohexane carboxylic acid, 7.5 g. (0.07 mole) of acetic anhydride and 75 ml. of o-xylene were refluxed for 17½ hours. The lower boiling materials were distilled off similarly as in Example I except in this case a considerable shorter time (about 4 hours) was required. In such distillation a small amount of benzoic acid was removed. The residue, amounting to 4.8 g. (about 71% yield), was a highly viscous liquid polyester. The reason for obtaining a liquid product in this case, as compared to a solid product in Example I, appears to be due largely to the shorter time of heating during the distillation, during which time additional reaction can occur and evidently did in Example I to an extent sufficient to produce solid polymers.

Much higher molecular weight products than those obtained in the preceding examples can be prepared by utilizing a higher reaction temperature and removing acetic acid from the reaction mixture as it is formed. Substitution of any of the other herein specified hydroxyacids for 1-hydroxycyclohexane carboxylic acid and of any of the other specified anhydrides for acetic anhydride will give analogous results.

I claim:

1. A polyester having the generic formula:

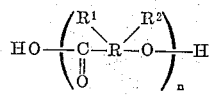

wherein R is an alicyclic group having 5–6 carbon atoms in a single ring, $R^1$ and $R^2$ each are selected from the group consisting of hydrogen and alkyl groups having 1–10 carbon atoms, the C=O and O groups each being attached to the same carbon atom in said ring and $n$ is an integer of at least 3.

2. A polyester having the generic formula:

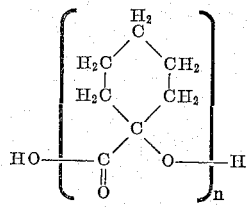

wherein $n$ is an integer of at least 3.

3. A polyester according to claim 2 wherein the value of $n$ is such that the polyester is a viscous liquid.

4. A polyester according to claim 2 wherein the value of $n$ is such that the polyester is an amorphous solid.

5. Method of forming a polyester which comprises heating a mixture of a 1-hydroxyalicyclic carboxylic acid having the generic formula:

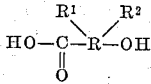

wherein R is an alicyclic group having 5–6 carbon atoms in a single ring, the C=O and O groups each being attached to the same carbon atom in said ring and $R^1$ and $R^2$ each are selected from the group consisting of hydrogen and alkyl groups having 1–10 carbon atoms, with a carboxylic acid anhydride in which the carboxylic acid is selected from the group consisting of aliphatic, alicyclic and aromatic acids having 2–8 carbon atoms, the molar ratio of said anhydride to the hydroxyalicyclic acid being in the range of 1:1 to 10:1, at a temperature in the range of 100–250° C. for a time such that the number of monomeric units derived from the hydroxyalicyclic acid is at least 3.

6. Method according to claim 5 wherein said molar ratio is in the range of 1:1 to 2:1.

7. Method according to claim 6 wherein the temperature is in the range of 130–180° C.

8. Method according to claim 5 wherein the temperature is in the range of 130–180° C.

9. Method according to claim 5 wherein the reaction is carried out with the hydroxyalicyclic acid and said anhydride dissolved in an inert solvent.

10. Method according to claim 5 wherein the hydroxyalicyclic acid is 1-hydroxycyclohexane carboxylic acid.

11. Method according to claim 10 wherein said anhydride is acetic anhydride.

12. Method according to claim 11 wherein the temperature is in the range of 130–180° C. and the reaction is carried out with the 1-hydroxycyclohexane and acetic anhydride dissolved in an inert solvent.

13. Method according to claim 12 wherein acetic acid is removed from the reaction mixture as the reaction proceeds.

14. Method according to claim 12 wherein said molar ratio is in the range of 1:1 to 2:1.

15. Method according to claim 5 wherein said anhydride is acetic anhydride.

16. Method according to claim 5 wherein the carboxylic acid corresponding to said anhydride is removed from the reaction mixture as the reaction proceeds.

References Cited by the Examiner

UNITED STATES PATENTS

| 2,600,376 | 6/52 | Caldwell | 260—78.3 |
| 2,605,207 | 7/52 | Drake et al. | 260—468 |
| 3,000,864 | 9/61 | Caldwell et al. | 260—78.3 |

FOREIGN PATENTS 641,320  8/50  Great Britain.

OTHER REFERENCES

Papa et al.: Journal American Chemical Society, vol. 76, pages 4441–4445 (1954), page 4444 relied upon herein.

JOSEPH L. SCHOFER, *Primary Examiner.*

H. N. BURSTEIN, J. R. LIBERMAN, LEON J. BERCOVITZ, *Examiners.*